Nov. 25, 1969  M. T. HILLHOUSE  3,480,062
TIRE STUD

Filed Jan. 16, 1968  2 Sheets-Sheet 1

INVENTOR
MIAL T. HILLHOUSE by: Wolfe, Hubbard, Voit & Osann
ATTORNEYS

United States Patent Office 3,480,062
Patented Nov. 25, 1969

3,480,062
TIRE STUD
Mial T. Hillhouse, Akron, Ohio, assignor to The Goodyear Tire & Rubber Company
Filed Jan. 16, 1968, Ser. No. 698,212
Int. Cl. B60c 11/16
U.S. Cl. 152—210                    24 Claims

ABSTRACT OF THE DISCLOSURE

A tire stud for use in the tread of a pneumatic tire which is formed of a unitary body consisting of a two-phase composition of sintered metal and ceramic particles.

---

The present invention relates generally to tire studs and, more particularly, to an improved tire stud for use as an insert in the tread or traction surface of tires for automotive vehicles.

In recent years, there has been increasing commercial acceptance of automotive vehicle tires having hard inserts or "studs" embedded in the tread portion thereof to improve the tire traction on road surfaces covered with snow, ice or the like. In most cases, the tire studs used heretofore have been made of two parts comprising a hard core of tungsten carbide or the like, which tends to be relatively brittle, and a surrounding sleeve of a more ductile material such as metal. These composite studs are, of course, relatively expensive because of the many fabrication and handling steps involved in the manufacture thereof.

More recently, it has been proposed to utilize certain one-piece studs, such as the one described in United States Patent No. 3,272,252 to C. E. Nordquist, issued Sept. 13, 1966, and entitled "Snow Tire And Insert Therefor." The stud described in the Nordquist patent is made of a sintered high alumina ceramic containing at least 99% by weight aluminum oxide in the form of randomly oriented crystals.

It is a primary object of the present invention to provide an improved one-piece or unitary tire stud which can be easily fabricated, and yet provides improved performance characteristics over the one-piece studs proposed heretofore. A related object is to provide such a stud which can be easily tailored to provide the strength and wear resistance for virtually any type of road conditions.

A further object of this invention is to provide an improved one-piece or unitary tire stud which can be manufactured at a relatively low cost, and which facilitates mass production thereof. In this connection, it is another object of the invention to provide such a stud which utilizes relatively inexpensive starting materials.

Still another object of the invention is to provide such an improved tire stud which is considerably lighter in weight, e.g., 15% to 20% lighter, than conventional tire studs.

Other objects and advantages of the invention will become apparent as the following description proceeds, taken in conjunction with the accompanying drawings, in which.

Figure 1:
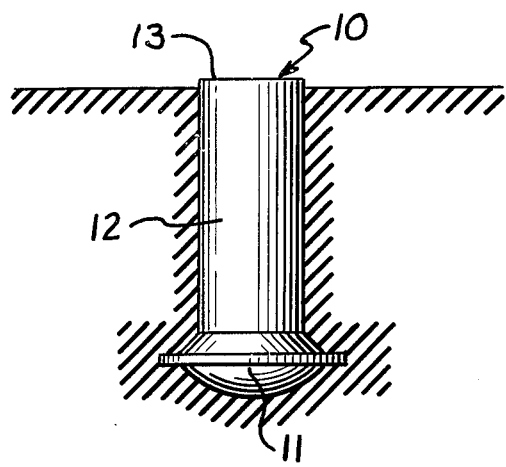
FIGURE 1 is an elevation of a preferred tire stud configuration for studs embodying this invention.

Although the present invention is susceptible to various modifications and alternative forms, certain specific embodiments thereof have been shown by way of example in the drawings and will be described in detail herein. It should be understood, however, that it is not intended to limit the invention to the particular embodiments disclosed, but on the contrary, the intention is to cover all alternatives, modifications, and equivalents falling within the spirit and scope of the invention as expressed in the appended claims.

Referring now to the drawings, in FIGURE 1 there is shown an exemplary tire stud 10 having an enlarged head portion 11 and a relatively thin elongated shank portion 12. The illustrative stud is thus adapted to be embedded in the traction surface of a vehicle tire with the axis of the stud extending in a generally radial direction within the tire body. The stud is positioned in the tire with the enlarged head portion 11 at the radially inner end, and with the end surface 13 of the shank portion 12 exposed at the traction surface for improving the traction of the tire on slippery surfaces such as ice, snow and the like.

In accordance with the present invention, the entire stud 10 is formed as a single unitary body consisting essentially of compacted powder particles selected from the group consisting of metallic powder particles and ceramic powder particles sintered together to form an integral abrasion resistant composition. In one preferred form of the invention, the unitary stud is formed of a two-phase composition of sintered metal and ceramic particles in which one phase is a metallic matrix of compacted metal powder particles sintered together, and the other phase is a multiplicity of hard inclusions of compacted ceramic powder particles sintered to each other and to the metallic matrix. In this particular embodiment, it is primarily the sintered powder ceramic inclusions, such as silicon carbide or calcium silicate for example, which provide the required abrasion resistance. The metallic matrix, which may be composed of one or more elemental metals, metal alloys, or metal compounds, is not necessarily as hard as the inclusion, but it must be strong and reactive with the ceramic phase so that it becomes integrally bonded to the hard ceramic inclusions. Exemplary matrix materials are iron, cobalt and nickel, although a number of other metals, alloys and compounds may be used, depending upon the particular ceramic material employed. When the abrasion resistant inclusions are formed of silicon carbide, for example, a preferred matrix metal is iron because iron reacts readily with silicon carbide, and thus forms a thoroughly integrated system therewith.

Preferred families of starting materials for use in the two-phase composition described above are as follows (percent by weight):

NO. 1

| | |
|---|---:|
| Iron | 67.0–95.0 |
| Graphite | 2.0–3.0 |
| Silicon carbide | 2.0–30.0 |

NO. 2

| | |
|---|---:|
| Iron | 89.0–97.0 |
| Graphite | 0.9–1.0 |
| Calcium Silicate | 2.0–10.0 |

NO. 3

| | |
|---|---:|
| Iron | 89.1 |
| Graphite | 0.9 |
| Tungsten carbide | 10.0 |

NO. 4

| | |
|---|---:|
| Iron | 85.13–95.85 |
| Graphite | 1.80–1.96 |
| Silicon carbide | 2.0–10.0 |
| Molybdenum | 0.3–0.5 |
| Nickel | 1.84–2.0 |
| Manganese | 0.21–0.41 |

NO. 5

| | |
|---|---:|
| Iron | 86.09–96.65 |
| Molybdenum | 0.3–0.5 |
| Nickel | 1.84–2.0 |
| Manganese | 0.21–0.41 |
| Boron carbide | 2.0–8.0 |
| Graphite | 1.0–3.0 |

The starting materials are formed and sintered by conventional powder metallurgy techniques. Thus, in a typical preparation procedure, the starting materials, all of which are in powder form, are initially blended and formed to the desired configuration under pressure so as to compact the powders to a desired density, e.g., 6.3 to 7.0 grams per cubic centimeter. The formed parts are then sintered in a conventional sintering furnace, following a predetermined time-temperature schedule selected in accordance with the particular starting materials employed, the properties desired in the sintered product, the desired production rate, equipment life and the like, as is well known in the powder metallurgy art. Iron, for example commences to sinter at relatively low temperatures, but only minimum strengths are achieved at temperatures below 1800° F. In order to achieve complete diffusion alloying of most compositions within the scope of this invention, it is generally preferred to sinter at a temperature within the range of about 1800° F. to 2200° F.

The sintering operation is preferably carried out in a relatively dry reducing atmosphere to provide cleaner surfaces at the junction of adjacent powder particles, thereby promoting necking between particles which, in turn, increase the overall strength of the sintered product. More particularly, atmospheres of endothermic gas, dissociated ammonia and pure hydrogen have been employed, although it will be understood that other types of atmospheres may be used. An atmosphere of endothermic gas is generally the least expensive, and generally does not require close control of the dew point level. When dissociated ammonia is used, a low dew point should be maintained because of the tendency of the gas to decarburize. A hydrogen atmosphere is particularly preferred when the starting materials contain chromium, in order to prevent conversion of the chromium to chromium oxide.

In a particularly preferred embodiment of the invention, the metallic phase is a sintered carbon steel formed by sintering together powder particles of iron, nickel, molybdenum, and carbon, and the ceramic phase is silicon carbide formed by the sintering of silicon carbide powder in the starting material, for example. It has been found that this particular combination provides an extremely hard material with optimum wearing characteristics over a wide range of different road conditions. Also, the metallic matrix formed by the carbon steel is sufficiently hard for stud use following the sintering operation, without any subsequent heat treatment or the like. As will be described in more detail in the illustrative examples below, the silicon carbide inclusions in this particular embodiment are generally surrounded by a hard reaction product of silicon and iron, which further controubtes to the wear resistance of the material.

With other compositions of the metallic matrix, it is usually preferable to subject the sintered two-phase composition to a heat treatment and quench subsequent to the sintering operation, in order to convert the metallic phase to a martensitic structure to provide the required degree of hardness therein. In general, a hardness of at least Rockwell C–50 is required in the metallic phase to provide the composite two-phase composition with the hardness and strength required for normal road conditions. As will be apparent to those skilled in the art, various time-temperature combinations may be used to effect transformation to a martensitic structure to achieve the desired hardness, using conventional heat treatment procedures, and the subsequent quench insures that the hardness attained by the heat treatment will be retained in the resultant studs during the variable environmental conditions encountered during the use thereof. The heat treatment and quench are particularly preferred in the method of this invention because of the relatively slow cooling cycle of conventional sintering furnaces, during which austenite, which has the power to dissolve carbon and allowing elements, produces small grain size, softness, and good ductility. On cooling slowly austenite transforms to ferrite and pearlite.

In a modified form of the invention, the stud is formed of a single unitary body consisting essentially of powder particles of one or more metals and metal carbides sintered together by conventional powder metallurgy techniques. For example, the stud can be formed entirely of sintered iron and iron carbide particles produced by sintering a compacted mixture of iron and graphite powders. Alternatively, complex carbides can be formed by adding other metal powders, such as nickel, chromium, molybdenum, tungsten, manganese and the like, to the iron and graphite. The composition in this form of the invention preferably contains two phases, one of which is a non-carbon-bearing metallic phase such as a ferritic phase, and the other of which is a metal carbide phase. Preferred families of starting materials for use in the metal carbide studs are as follows (percent by weight):

NO. 1

| | |
|---|---:|
| Iron | 98.0–99.8 |
| Graphite | 0.2–2.0 |

NO. 2

| | |
|---|---:|
| Iron | 93.75–95.75 |
| Graphite | 1.0–1.25 |
| Copper | 3.0–5.0 |

NO. 3

| | |
|---|---:|
| Iron | 86.6 |
| Manganese | 12.0 |
| Graphite | 1.4 |

NO. 4

| | |
|---|---:|
| Iron | 92.5–96.5 |
| Graphite | 1.5 |
| Molybdenum | 2–6 |

NO. 5

| | |
|---|---|
| Iron | 92.5–96.5 |
| Graphite | 1.5 |
| Tungsten | 2.0–6.0 |

NO. 6

| | |
|---|---|
| Iron | 96.8–97.5 |
| Nickel | 0.2–1.2 |
| Molybdenum | 0.5–1.2 |
| Graphite | 1.8 |

NO. 7

| | |
|---|---|
| Iron | 92.71–95.27 |
| Nickel | 1.08–1.11 |
| Molybdenum | 0.65–0.67 |
| Chromium | 1.85–1.91 |
| Graphite | 0.95–1.85 |
| Oxalic acid | 1.00–1.85 |

NO. 8

| | |
|---|---|
| Iron | 81.6 |
| Manganese | 15.0 |
| Molybdenum | 2.0 |
| Graphite | 1.4 |

NO. 9

| | |
|---|---|
| Iron | 95.37 |
| Nickel | 1.11 |
| Molybdenum | 0.67 |
| Chromium | 1.91 |
| Graphite | 0.95 |

The oxalic acid in formulation No. 7 above serves as an internal reducing agent which aids in keeping the potential oxide-forming materials available for the formation of carbides and other reactions during the sintering operation.

Since ceramic inclusions are not normally included in this embodiment of the invention, it is especially important that the sintered product be subjected to a heat treatment or the like to effect a transformation to an abrasion resistant martensitic structure. With certain compositions, the hardening can be effected by work hardening which occurs through natural usage as the exposed end of the stud strikes the road surface. For example, compositions containing about 12 to 13% by weight manganese, in combination with iron and carbon, exhibit a low apparent hardness before use, but acquire a wear resistant surface on the exposed end of the stud via impact hardening during normal usage.

It has been found that the addition of small amounts of metals having relatively low melting points increases the strength of the sintered metal carbide studs, apparently by increasing the density of the composition. For example, it has been found that the addition of small amounts of copper to studs made of sintered iron carbide powder significantly increases the apparent hardness thereof.

The carbides contained in the tire studs of this invention are preferably formed by reaction of elemental metals and carbon in the powdered starting materials, although certain of the carbides may already be present in the compound form in the starting materials. In general, the starting mixture should contain at least 0.8% by weight carbon, and preferably at least 1.0% by weight. Different forms of carbon may be used in the starting materials, although when iron is one of the starting materials it is preferred to use micro-crystal natural graphite because of its high degree of reactivity with iron. One of the advantages of the present invention is that it does not require a high degree of purity in the starting powders; for example, certain of the exemplary iron powders to be described below contain as little as 96% by weight iron, with the balance of the powder being made up of non-ferrous materials.

The particular particle size of the powder starting materials is not critical, but it has been found that a relatively wide range of particle sizes, as opposed to a uniform particle size, results in a high degree of continuity due to the interparticle cohesion achieved during sintering. It is believed that the different particle sizes provide close packing when the starting powders are compacted, due to the filling of the small spaces between the larger particles by the smaller particles. A typical particle size distribution for the starting iron and graphite powders is as follows:

| Tyler mesh | Percent by weight |
|---|---|
| On 80 ---max-- | 2.5 |
| On 100 | 5.0 |
| On 200 | 35–30 |
| On 325 | 25–35 |
| Thru 325 | 20–30 |

Compositions containing larger fractions of the larger particles in the above table become increasingly weak due to the decrease in the area of mating particle surfaces. Larger fractions of the smaller particles on the other hand, decrease the compressibility of the compoistion so that it becomes increasingly difficult to handle the compacted studs in their unsintered or "green" state without excessive breakage. When the ceramic materials such as silicon carbide, calcium silicate, and the like are included in the starting material, the particle size of the ceramic material should be less than 100 mesh Tyler because the higher amount of surface area results in a higher degree of reaction with the matrix and, in non-reactive elements, a higher degree of locking structure in conjunction with the matrix.

Although the techniques described above and the many possible variations therein are well known to those skilled in this art, certain exemplary procedures will be described in detail in the following illustrative examples:

EXAMPLE 1

The starting material was a mixture of 1.96% by weight graphite powder, 2% by weight silicon carbide powder, and 96.04% by weight prealloyed atomized nickel steel alloy powder (Easton RZ4600) having the following composition:

| | Typical, Percent | Specification, Percent max. |
|---|---|---|
| Nickel | 1.84 | 2.0 |
| Molybdenum | .30 | 0.5 |
| Carbon | .08 | 0.15 |
| Hydrogen loss | .69 | 0.80 |
| Sulfur | .025 | 0.03 |
| Phosphorus | .010 | 0.02 |
| Manganese | .21 | 0.40 |
| Silicon | .020 | 0.05 |
| Acid Insolubles | .07 | 0.10 |
| Iron | Balance | Balance |

The graphite employed was a fine flake natural graphite (e.g., Southwestern Graphite #1651 MC) which combines readily with iron to form a eutectic.

The above mixture was blended for thirty minutes with 0.75% by weight lithium stearate and 0.1% by weight kerosene added as compacting aids. Tire studs having the configuration shown in FIG. 1 were then molded from the resulting blended mixture under a pressure of forty tons per square inch. which was sufficient to provide the molded parts with a density of 5.81 grams per cubic centimeter. Next, the molded parts were sintered in a conventional furnace at a temperature of 2050° F. for 30 minutes in an atmosphere of dissociated ammonia at a dew point of 0 to —10° F. After the 30-minute sintering operation, the parts were cooled to room temperature, and then hardened by heat treating at 1550° F. and oil quenching to room temperature. The heating was carried out in an atmosphere of endothermic gas. The final product had a length of about 0.69 inch, a shank diameter of 0.20 inch, a head diameter of 0.36 inch, and weighed about 2 grams.

The final hardened tire studs were tested for "abrasion resistance" and "abrasion factor" by the CCPA P–112 test method. At 60% loading, the abrasion resistance was 56.5, and the abrasion factor was 34.6. The sintered density was 6.07 grams per cubic centimeter, the apparent hardness was Rockwell C-35, and the microhardness of the matrix was Rockwell C-60 to 63.

Figure 2:
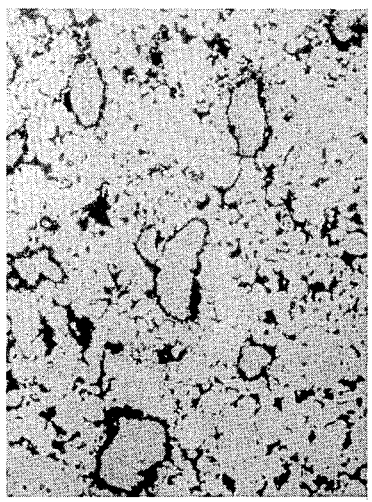
FIGURE 2 is a photomicrograph of a tire stud material embodying this invention, in unetched condition, at a magnification of 100×.
Figure 3:
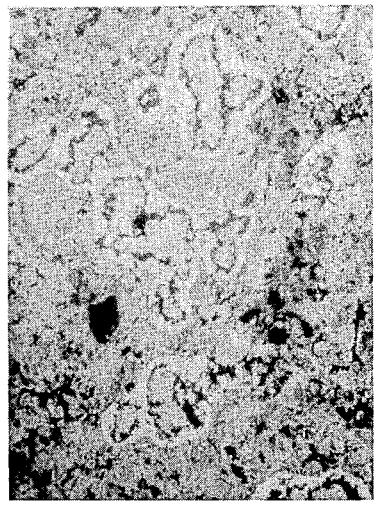
FIGURE 3 is a photomicrograph of the same material shown in FIGURE 2, in etched condition, at the same magnification.

Photomicrographs of the above product at a magnification of 100× are shown in FIGS. 2 and 3. FIG. 2 showing the product unetched, and FIG. 3 showing it etched. These photomicrographs show islands of sintered silicon carbide particles surrounded by a hard reaction product of iron and silicon carbide embedded in a sintered nickel steel alloy matrix of fine grained martensite.

EXAMPLE 2

Figure 4:
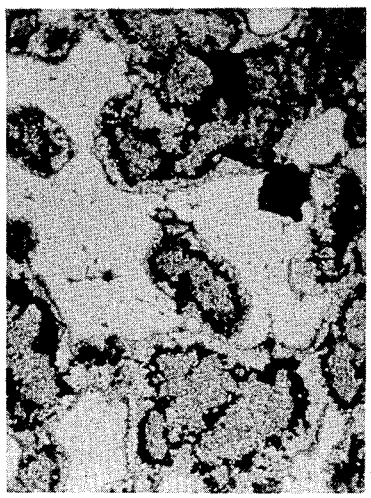
FIGURE 4 is a photomicrograph of another tire stud material embodying the invention, in unetched condition, at a magnification of 100×.
Figure 5:
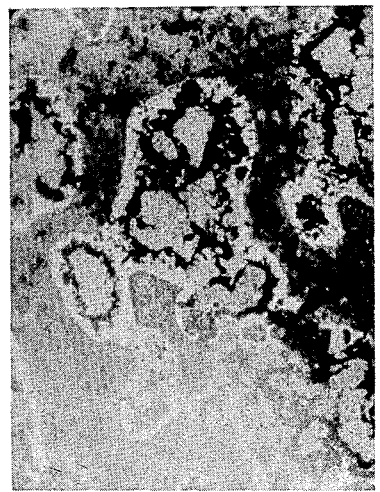
FIGURE 5 is a photomicrograph of the same material shown in FIGURE 4, in etched condition, at the same magnification.

The procedure described in Example 1 was repeated using 6% by weight silicon carbide powder, instead of 2%. The resulting product had an abrasion resistance of 70 and an abrasion factor of 41, according to the CCPA P-112 test method of 60% loading. The apparent hardness was Rockwell B-92, and the microhardness of the matrix was Rockwell C-58 to 61. Photomicrographs of this product in unetched and etched form are shown in FIGS. 4 and 5, respectively. These photomicrographs are similar to those of FIGS. 2 and 3 in that they show islands of sintered silicon carbide particles surrounded by a hard reaction product of iron and silicon carbide embedded in a sintered nickel steel alloy matrix of fine grained martensite. Because of the larger amount of silicon carbide employed, the silicon carbide inclusions occupy a relatively greater space in FIGS. 4 and 5.

EXAMPLE 3

The starting material was a mixture of 1% by weight graphite powder, 2% by weight atomized copper, and 97% by weight prealloyed atomized iron powder having the following composition:

|  | Typical, Percent | Specification, Percent max. |
|---|---|---|
| Nickel | 1.84 | 2.0 |
| Molybdenum | .30 | 0.5 |
| Carbon | .08 | 0.15 |
| Hydrogen loss | .69 | 0.80 |
| Sulfur | .025 | 0.03 |
| Phosphorus | .010 | 0.02 |
| Manganese | .21 | 0.40 |
| Silicon | .020 | 0.05 |
| Acid Insolubles | .07 | 0.10 |
| Iron | Balance | Balance |

The graphite employed was a fine flake natural graphite (e.g., Southwestern Graphite #1651 MC) which combines readily with iron to form a eutectic.

The above mixture was blended for thirty minutes with 1% by weight lithium stearate and 0.1% by weight kerosene added as compacting aids. Tire studs of a desired configuration were then molded from the resulting blended mixture under a pressure of 30 to 40 tons per square inch, which was sufficient to provide the molded parts with a density of 6.3 to 7.0 grams per cubic centimeter. Next, the molded parts were sintered in a conventional furnace at a temperature of 2050° F. for thirty minutes in an endothermic atmosphere held at 8° to 20° F. dew point. After the thirty-minute sintering operation, the parts were cooled to room temperature, and then hardened by heat treating at 1630° F. and oil quenching to room temperature. The heating was carried out in endothermic gas atmosphere and the hardness level attained in the final product was in the range of Rockwell 30T (ASTM hardness for composite materials) 80 to 84.

The final hardened tire studs were tested for "abrasion resistance" and "abrasion factor" by the CCPA P-112 test method. At 60% loading, the "abrasion resistance" was 22.6, and the "abrasion factor" was 15.7. The sintered density was 7.0 grams per cubic centimeter, and the apparent hardness was Rockwell C-31.

Figure 6:
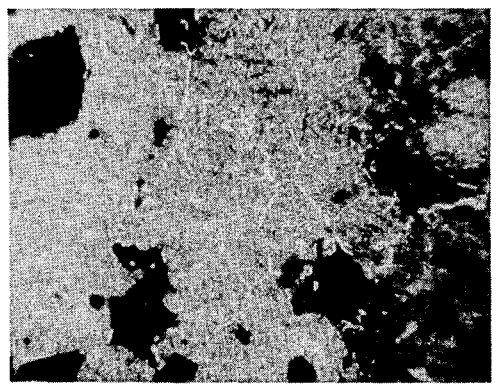
FIGURE 6 is a photomicrograph of still another tire stud material embodying the invention, at a magnification of 500×.

A photomicrograph of the product of this example, shown in FIG. 6, revealed complete transformation of the sintered iron-carbon particles to a martensitic structure. The acicular structure shown in FIG. 6, which is typical of martensite, is outlined in all areas by the lighter complex carbides of the various metals included in the starting mixture.

In further examples of the invention, the procedure of Example 3 was repeated with the following starting mixtures:

EXAMPLE 4

| | Parts |
|---|---|
| Iron Powder | 99.2 |
| Graphite | .8 |

EXAMPLE 5

| | |
|---|---|
| Iron | 98.8 |
| Graphite | 2.0 |

EXAMPLE 6

| | |
|---|---|
| Iron | 98.0 |
| Graphite | 2.0 |

EXAMPLE 7

| | |
|---|---|
| Iron | 86.6 |
| Manganese | 12.0 |
| Graphite | 1.4 |

EXAMPLE 8

| | |
|---|---|
| Iron | 98.6 |
| Graphite | 1.4 |

EXAMPLE 9

| | |
|---|---|
| Iron | 99.4 |
| Graphite | .6 |

EXAMPLE 10

| | |
|---|---|
| Iron | 99.6 |
| Graphite | .4 |

EXAMPLE 11

| | |
|---|---|
| Iron | 99.8 |
| Graphite | .2 |

EXAMPLE 12

| | |
|---|---|
| Iron | 95.75 |
| Graphite | 1.25 |
| Copper | 3.00 |

EXAMPLE 13

| | |
|---|---|
| Iron | 95.50 |
| Graphite | 1.00 |
| Copper | 3.00 |

EXAMPLE 14

| | |
|---|---|
| Iron | 93.75 |
| Graphite | 1.25 |
| Copper | 5.00 |

EXAMPLE 15

| | |
|---|---|
| Iron | 99.0 |
| Copper | 1.0 |

EXAMPLE 16

| | |
|---|---|
| Iron | 98.75 |
| Copper | 1.25 |

EXAMPLE 17

| | |
|---|---|
| Iron | 98.5 |
| Copper | 1.5 |

EXAMPLE 18

| | |
|---|---|
| Iron | 98.5 |
| Graphite | 1.5 |

EXAMPLE 19

| | |
|---|---|
| Iron | 96.5 |
| Graphite | 1.5 |
| Molybdenum | 2.0 |

EXAMPLE 20

| | |
|---|---|
| Iron | 94.5 |
| Graphite | 1.5 |
| Molybdenum | 4.0 |

EXAMPLE 21

| | Parts |
|---|---|
| Iron | 92.5 |
| Graphite | 1.5 |
| Molybdenum | 6.0 |

EXAMPLE 22

| | |
|---|---|
| Iron | 96.5 |
| Graphite | 1.5 |
| Tungsten | 2.0 |

EXAMPLE 23

| | |
|---|---|
| Iron | 94.5 |
| Graphite | 1.5 |
| Tungsten | 4.0 |

EXAMPLE 24

| | |
|---|---|
| Iron | 92.5 |
| Graphite | 1.5 |
| Tungsten | 6.0 |

EXAMPLE 25

| | |
|---|---|
| Iron | 81.60 |
| Manganese | 15.00 |
| Molybdenum | 2.00 |
| Graphite | 1.40 |

EXAMPLE 26

| | |
|---|---|
| Iron | 97.5 |
| Nickel | .2 |
| Molybdenum | .5 |
| Graphite | 1.8 |

EXAMPLE 27

| | |
|---|---|
| Iron | 96.5 |
| Nickel | 1.2 |
| Molybdenum | .5 |
| Graphite | 1.8 |

EXAMPLE 28

| | |
|---|---|
| Iron | 96.8 |
| Nickel | .2 |
| Molybdenum | 1.2 |
| Graphite | 1.8 |

EXAMPLE 29

| | |
|---|---|
| Iron | 100.00 |
| Nickel | 1.16 |
| Molybdenum | .70 |
| Chromium | 2.00 |
| Graphite | 2.00 |
| Oxalic acid | 2.00 |

EXAMPLE 30

| | |
|---|---|
| Iron | 100.00 |
| Nickel | 1.16 |
| Molybdenum | .70 |
| Chromium | 2.00 |
| Graphite | 1.00 |
| Oxalic acid | .10 |

EXAMPLE 31

| | |
|---|---|
| Iron | 100.00 |
| Nickel | 1.16 |
| Molybdenum | .70 |
| Chromium | 2.00 |
| Graphite | 1.00 |

EXAMPLE 32

| | |
|---|---|
| Iron | 89.1 |
| Graphite | .9 |
| Tungsten carbide | 10.0 |

EXAMPLE 33

| | |
|---|---|
| Iron | 89.1 |
| Graphite | .9 |
| Calcium silicate | 10.0 |

EXAMPLE 34

| | Parts |
|---|---|
| Iron | 94.0 |
| Graphite | 1.0 |
| Calcium silicate | 5.0 |

EXAMPLE 35

| | |
|---|---|
| Iron | 97.0 |
| Graphite | 1.0 |
| Calcium silicate | 2.0 |

EXAMPLE 36

| | |
|---|---|
| Iron | 95.05 |
| Graphite | 2.95 |
| Silicon carbide | 2.00 |

EXAMPLE 37

| | |
|---|---|
| Iron | 93.125 |
| Graphite | 2.875 |
| Silicon carbide | 4.000 |

EXAMPLE 38

| | |
|---|---|
| Iron | 91.175 |
| Graphite | 2.825 |
| Silicon carbide | 6.000 |

EXAMPLE 39

| | |
|---|---|
| Iron | 89.25 |
| Graphite | 2.75 |
| Silicon carbide | 8.00 |

EXAMPLE 40

| | |
|---|---|
| Iron | 87.3 |
| Graphite | 2.7 |
| Silicon carbide | 10.0 |

EXAMPLE 41

| | |
|---|---|
| Iron | 88 |
| Graphite | 2 |
| Silicon carbide | 10 |

EXAMPLE 42

| | |
|---|---|
| Iron | 77 |
| Graphite | 3 |
| Silicon carbide | 20 |

EXAMPLE 43

| | |
|---|---|
| Iron | 67 |
| Graphite | 3 |
| Silicon carbide | 30 |

In certain of the examples described above, different commercially available iron powders were substituted for the particular iron powder described in Examples 1 and 3, with no significant effect on the properties of the final product. The specific iron powders used included the following:

HOEGANAES ANCOR 1015 IRON POWDER

| | Typical chemical analysis (percent) |
|---|---|
| Iron | 98.6 |
| Silicon dioxide | 0.10 |
| Carbon | 0.09 |
| Hydrogen loss | 0.65 |
| Sulfur | 0.02 |
| Phosphorus | 0.01 |

AMAX PYRON M-IRON ATOMIZED POWDER

| | Chemical analysis (percent) |
|---|---|
| Iron | 96.0–97.5 |
| Carbon | 0.01–0.025 |
| Sulfur | 0.005 |
| Phosphorus | 0.012 |
| Manganese | 0.25–0.60 |
| Molybdenum | 0.8–1.2 |
| Acid insolubles | 0.20–0.40 |
| Hydrogen loss | 0.70–1.20 |

As can be seen from the foregoing detailed description, this invention provides an improved one-piece or unitary tire stud which can be easily fabricated, and yet provides improved performance characteristics. The stud can be fabricated by conventional powder metallurgy techniques, and can be easily tailored to provide the strength and wear resistance for virtually any type of road conditions. The unitary tire stud can be manufactured at a relatively low cost, and is readily susceptible to mass production utilizing inexpensive starting materials. The stud of this invention is also considerably lighter in weight than conventional tire studs.

I claim as my invention:

1. In a vehicle tire having a body portion with a traction surface for engaging a road surface, a plurality of elongated studs embedded in said traction surface with the axes of the studs extending in a generally radial direction in said body portion of the tire, each of said studs being formed of a single unitary body consisting essentially of a two-phase composition of sintered metal and ceramic particles in which one phase is a metallic matrix of compacted metallic powder particles sintered together, and the other phase is a multiplicity of hard inclusions of compacted ceramic powder particles sintered together and to said metallic matrix to form an integral abrasion resistant structure.

2. A studded vehicle tire as defined in claim 1 in which said metallic powder particles consist of at least one metal selected from the group consisting of iron, nickel, and cobalt, and said ceramic powder particles consist of at least one material selected from the group consisting of silicon carbide and calcium silicate.

3. A studded vehicle tire as defined in claim 1 in which said metallic powder particles consist of iron and said ceramic powder particles consist of silicon carbide reacted with said iron.

4. A studded vehicle tire as defined in claim 1 in which said metallic phase is a carbon steel formed by sintering together powder particles of iron, nickel, molybdenum, and carbon.

5. A studded vehicle tire as defined in claim 4 in which the ceramic powder particles are silicon carbide.

6. In a vehicle tire having a body portion with a traction surface for engaging a road surface, a plurality of elongated studs embedded in said traction surface with the axes of the studs extending in a generally radial direction in said body portion of the tire, each of said studs being formed of a single unitary body consisting essentially of powder particles of at least one metal and metal carbide sintered together and heat treated to form an abrasion resistant martensitic structure.

7. A studded vehicle tire as defined in claim 6 in which at least a major portion of said powder particles consists of iron and iron carbide.

8. A studded vehicle tire as defined in claim 6 in which said metal carbide includes iron and at least one metal selected from the group consisting of manganese, copper, molybdenum, tungsten, nickel, chromium, calcium, and silicon.

9. A studded vehicle tire as defined in claim 6 in which said metal carbide is a complex carbide of at least two metals selected from the group consisting of iron, nickel, and chromium and alloys thereof.

10. A method of manufacturing tire studs comprising the steps of forming a single unitary tire stud body having an elongated shank portion and an enlarged portion adapted to retain the stud within a vehicle tire, said stud body consisting essentially of a compacted mixture of metal and ceramic particles, and sintering said body to form an integral two-phase structure in which one phase is a metallic matrix of compacted metallic powder particles sintered together and the other phase is a multiplicity of hard inclusions of compacted ceramic powder particles sintered together and to said metallic matrix.

11. A method of manufacturing tire studs as defined in claim 10 wherein said sintering step is carried out in a reducing atmosphere.

12. A method of manufacturing tire studs comprising the steps of forming a single unitary tire stud body having an elongated shank portion and an enlarged portion adapted to retain the stud within a vehicle tire, said stud body consisting essentially of a compacted mixture of metal and carbon particles, and sintering said body to form an integral structure of compacted metallic and metal carbide powder particles sintered together.

13. A method of manufacturing tire studs as defined in claim 12 wherein said sintering step is carried out in a reducing atmosphere.

14. In a vehicle tire having a body portion with a traction surface for engaging a road surface, a plurality of elongated studs embedded in said traction surface with the axes of the studs extending in a generally radial direction in said body portion of the tire, each of said studs being formed of a single unitary body consisting essentially of compacted powder particles selected from the group consisting of metallic powder particles and ceramic powder particles sintered together to form an integral abrasion resistant structure.

15. A vehicle tire stud formed of a single unitary body consisting essentially of a two-phase composition of sintered metal and ceramic particles in which one phase is a metallic matrix of compacted metallic powder particles sintered together, and the other phase is a multiplicity of hard inclusions of compacted ceramic powder particles sintered together and to said metallic matrix to form an integral abrasion resistant structure.

16. A vehicle tire stud as defined in claim 15 in which said metallic powder particles consist of at least one metal selected from the group consisting of iron, nickel, and cobalt, and said ceramic powder particles consist of at least one material selected from the group consisting of silicon carbide and calcium silicate.

17. A vehicle tire stud as defined in claim 15 in which said metallic powder particles consist of iron and said ceramic powder particles consist of silicon carbide reacted with said iron.

18. A vehicle tire stud as defined in claim 15 in which said metallic phase is a carbon steel formed by sintering together powder particles of iron, nickel, molybdenum, and carbon.

19. A vehicle tire stud as defined in claim 18 in which the ceramic powder particles are silicon carbide.

20. A vehicle tire stud formed of a single unitary body consisting essentially of powder particles of at least one metal and metal carbide sintered together and heat treated to form an abrasion resistant martensitic structure.

21. A vehicle tire stud as defined in claim 20 in which at least a major portion of said powder particles consists of iron and iron carbide.

22. A vehicle tire stud as defined in claim 20 in which said metal carbide includes iron and at least one metal selected from the group consisting of manganese, copper, molybdenum, tungsten, nickel, chromium, calcium, and silicon.

23. A vehicle tire stud as defined in claim 20 in which said metal carbide is a complex carbide of at least two metals selected from the group consisting of iron, nickel, and chromium and alloys thereof.

24. A vehicle tire stud formed of a single unitary body consisting essentially of compacted powder particles selected from the group consisting of metallic powder particles and ceramic powder particles sintered together to form an integral abrasion resistant structure.

References Cited

FOREIGN PATENTS 1,354,150  2/1964  France.

ARTHUR L. LA POINT, Primary Examiner

C. B. LYON, Assistant Examiner